Patented Mar. 23, 1926.

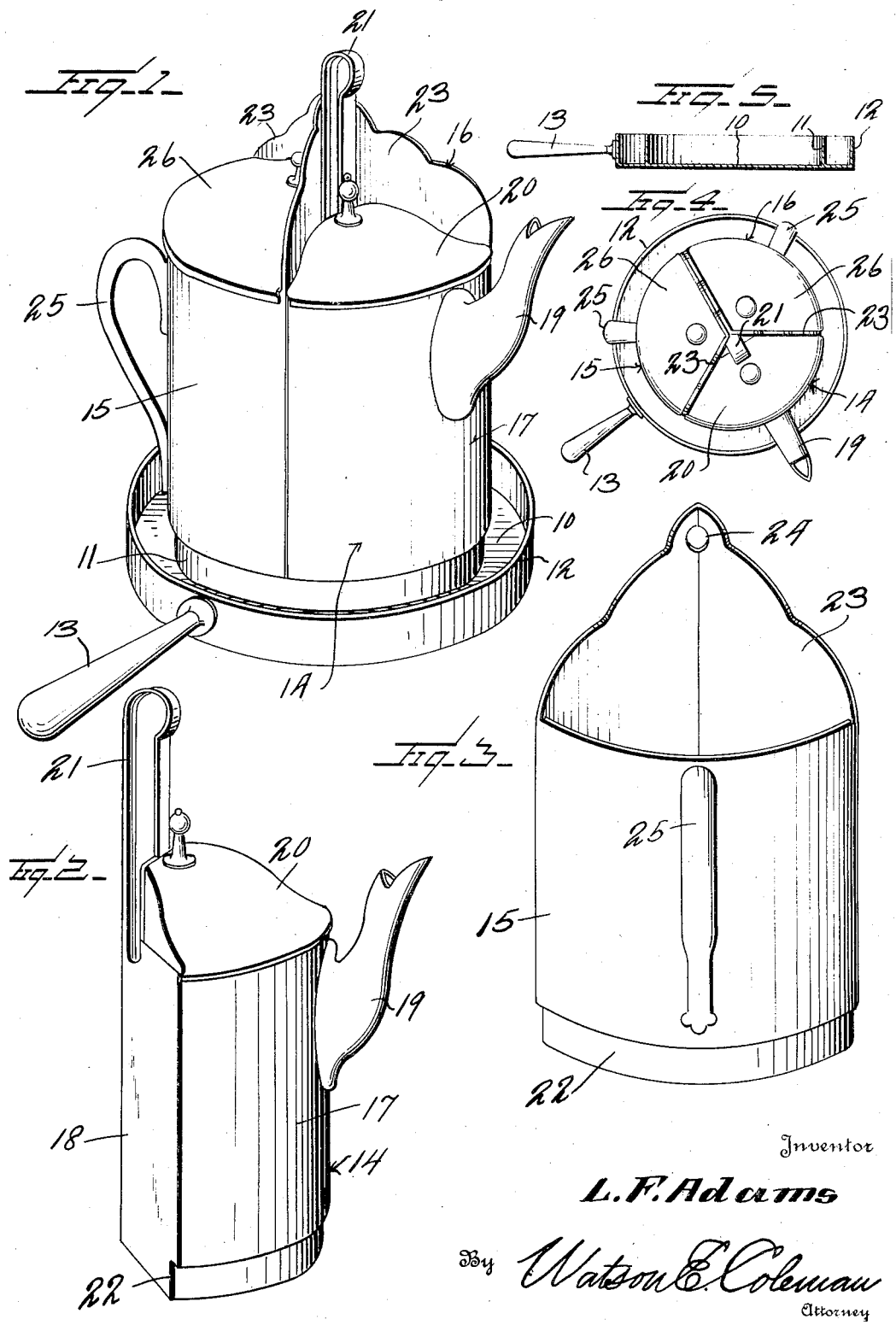

1,577,781

UNITED STATES PATENT OFFICE.

LETHA FLORENCE ADAMS, OF SMITHDALE, MISSISSIPPI.

SECTIONAL FOOD COOKER.

Application filed September 3, 1925. Serial No. 54,345.

*To all whom it may concern:*

Be it known that I, LETHA FLORENCE ADAMS, a citizen of the United States, residing at Smithdale, in the county of Amite and State of Mississippi, have invented certain new and useful Improvements in Sectional Food Cookers, of which the following is a specification, reference being had to the accompanying drawings.

This invention relates to cooking utensils, and particularly to those utensils which are designed to be used for cooking and then brought on the table with the cooked food therein.

One of the objects of the invention is to provide a cooking utensil comprising a plurality of segmental interfitting sections, each section being a complete cooking device in itself.

A further object is to provide a drip pan or base upon which the cooking utensils are adapted to rest when placed over the fire to thereby prevent the bottoms of the vessels from becoming sooted and also to catch any drip or liquid which may overflow from the vessel due to boiling.

A still further object is to provide means for preventing liquid from a vessel which boils over from entering the next adjacent vessel.

Other objects will appear in the course of the following description.

My invention is illustrated in the accompanying drawing, wherein:—

Figure 1 is a perspective view of a culinary utensil constructed in accordance with my invention;

Figure 2 is a perspective view of the coffee pot section of the utensil;

Figure 3 is a perspective view of one of the other sectional cooking vessels;

Figure 4 is a top plan view of the structure shown in Figure 1;

Figure 5 is a diametrical section through the base of the utensil;

Referring to the drawing, it will be seen that the base of my cooking utensil consists of a pan or plate, designated generally 10, formed with an inner wall 11 and an outer wall 12 concentric to the inner wall, this pan being provided with a handle 13. Adapted to rest upon this pan are a plurality of cooking vessels, each segmental in shape. I have illustrated three vessels 14, 15 and 16, each of these vessels being alike in general shape and each being segmental in plan view.

The vessel 14 constitutes a coffee pot. It has a rounded front wall 17 and an angular rear wall 18. The front wall is provided with the usual spout 19 and the vessel is provided with a lid 20 and also with an upwardly extending handle 21 extending upwardly from the rear wall of the vessel and extending downwardly nearly to the cover and then extending inwardly or rearwardly, this permitting the cover or lid to be removed but providing a handle for the pot. The lower end of the front wall at the bottom of the pot is inwardly extended and then downwardly extended to form an arcuate recess 22 within which the inner flange 11 is adapted to fit.

The vessel 15 is also arcuately recessed, as at 22, in the same manner as the vessel 14. This vessel has also a curved front wall and angular rear walls, but the rear wall 23 extends upward a considerable distance above the top of the vessel and is provided with a perforation 24. The front wall has a handle 25 whereby the vessel may be lifted.

The vessel 16 is of the same shape and character as the vessel 15. Both of these vessels are provided with covers 26. The rear face of the handle 21 is triangular in form so that the upward extensions of the rear walls 23 of the vessels 15 and 16 may fit against this handle extension.

In the use of this device, the three vessels are disposed with their recessed lower portions 22 within the inner flange 11, thus in a way locking the vessels to each other and permitting the pan 10 to be readily lifted with the vessels. If one of the vessels is used for the purpose of brewing tea or making coffee, the other vessels may be used as vegetable boilers, cereal boilers, egg boilers, or for any other culinary purpose. Thus, for instance, in preparing breakfast, coffee may be cooked in the pot 14, cereal may be cooked in the vessel 15, and eggs may be boiled in the vessel 16. If the coffee pot or any other of the vessels should boil over, the liquid will not pass down into the fire as it would if the vessels were disposed directly upon the top of the stove or over an oil burner, but the liquid will be caught in the annular channel between the walls 11 and 12 of the pan and the shields which are formed by the upwardly extending rear walls 23 will prevent any liquid which may boil over from one pot or vessel boiling over into the next adjacent pot or vessel. After the cooking has been completed, the vessels may be lifted off and carried to the table as separate utensils and so used, or if desired, of course, the pan itself may be carried to the table with the vessels on it.

It is obvious that while I have illustrated a certain type of vessel that the style may be changed and the details of construction may be changed without departing from the spirit thereof as defined in the appended claims. The device is convenient, compact, and in line with the simplification of household matters that is being carried on today.

I claim:—

1. A cooking utensil comprising a pan having a circular bottom, an outer upstanding wall and an inner upstanding wall, the two walls together defining an annular receptacle, and a plurality of interfitting cooking utensils adapted to fit within the inner rim.

2. A cooker of the character described comprising a plurality of vessels segmental in plan to thereby permit them to be interfitted, certain of the vessels having their angular walls extended upward beyond the front wall, said angular walls constituting shields to prevent liquid boiling over from one vessel into the next adjacent vessel, each of these vessels having curved outer walls, the lower end of the outer wall being inwardly recessed, and a pan having an outer rim and an inner rim defining two walls of an annular receptacle, the recessed portions of the receptacle fitting within the inner rim of the pan.

3. A cooking utensil of the character described comprising a pan having an outer upstanding wall and an inner upstanding wall and a handle, a plurality of vessels coacting therewith, each vessel being segmental in form to provide a front curved wall and two inwardly converging side walls, the vessels being adapted to fit together within said inner upstanding wall, the lower ends of the vessels being inwardly recessed to this end, certain of the vessels having their angular walls extended upward beyond the front wall and constituting shields preventing liquid from boiling over from one vessel into the next adjacent vessel, one of said vessels being provided with a spout upon its front wall, a cover, and an upwardly extending handle at the juncture of its side walls disposed inward of said cover, the other vessels being provided with handles upon their front walls.

In testimony whereof I hereunto affix my signature.

LETHA FLORENCE ADAMS.